(12) United States Patent
Lee et al.

(10) Patent No.: US 7,286,089 B2
(45) Date of Patent: Oct. 23, 2007

(54) ANTENNA UNIT AND ELECTRICAL CONNECTION DEVICE THEREOF AND PORTABLE DEVICE HAVING THE SAME

(75) Inventors: Jae-Ho Lee, Gumi-si (KR); Do-Hwan Choi, Daegu (KR); Yeong-Moo Ryu, Gumi-si (KR); Hark-Sang Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 11/172,870

(22) Filed: Jul. 5, 2005

(65) Prior Publication Data

US 2006/0001581 A1 Jan. 5, 2006

(30) Foreign Application Priority Data

Jul. 2, 2004 (KR) ............... 10-2004-0051713
Nov. 12, 2004 (KR) ............... 10-2004-0092413

(51) Int. Cl.
*H01Q 1/24* (2006.01)
(52) U.S. Cl. ............................. 343/702; 379/339
(58) Field of Classification Search ............... 343/702; 455/575.5, 575.4, 41.1, 575.3, 575.1, 550.1; 379/339; 361/679, 600
See application file for complete search history.

(56) References Cited

U.S. PATENT DOCUMENTS

| | | | | |
|---|---|---|---|---|
| 5,255,001 | A * | 10/1993 | Tamura et al. | 343/702 |
| 5,905,467 | A * | 5/1999 | Narayanaswamy et al. | 343/702 |
| 5,978,655 | A * | 11/1999 | Ohura et al. | 455/41.1 |
| 6,545,643 | B1 * | 4/2003 | Sward et al. | 343/702 |
| 6,933,896 | B2 * | 8/2005 | Sward et al. | 343/702 |
| 6,980,840 | B2 * | 12/2005 | Kim et al. | 455/575.4 |
| 7,106,260 | B2 * | 9/2006 | Ryu et al. | 343/702 |
| 7,117,024 | B1 * | 10/2006 | Dorfman | 455/575.5 |

FOREIGN PATENT DOCUMENTS

| CN | 1325567 A | 12/2001 |
|---|---|---|
| CN | 2521833 Y | 11/2002 |

* cited by examiner

*Primary Examiner*—Hoanganh Le
(74) *Attorney, Agent, or Firm*—Roylance, Abrams, Berdo & Goodman, LLP

(57) ABSTRACT

A portable device with a sliding variable built-in antenna is provided including a main body, a variable built-in antenna which is assembled at a predetermined location of the main body and configured to slide up/down with respect to the main body according to an antenna reception sensitivity, and an electrical connection device for signal transmission between the main body and the variable built-in antenna.

11 Claims, 29 Drawing Sheets

ANTENNA UNIT AND ELECTRICAL CONNECTION DEVICE THEREOF AND PORTABLE DEVICE HAVING THE SAME

CROSS-REFERENCE TO RELATED APPLICATIONS

This application claims the benefit under 35 U.S.C. § 119(a) of Korean Patent Application No. 10-2004-0051713 entitled "Antenna Unit, Electrical Connection Device Thereof, And Portable Device Having The Same" filed in the Korean Intellectual Property Office on Jul. 2, 2004, and Korean Patent Application No. 10-2004-0092413 entitled "Antenna Unit, Electrical Connection Device Thereof, And Portable Device Having The Same" filed in the Korean Intellectual Property Office on Nov. 12, 2004, the entire disclosures of both are hereby incorporated by reference.

BACKGROUND OF THE INVENTION

1. Field of the Invention

The present invention relates generally to portable devices including digital communication devices such as cellular phones, personal digital assistants (PDAs), hand-held phones (HHPs), camera phones, game phones, and Internet phones, and in particular, to an antenna unit thereof. More specifically, the present invention relates to an antenna unit and an electrical connection device thereof, of which the opening/closing is simple and wherein an antenna reception sensitivity level is adjustable and further relates to a portable device having the same.

2. Description of the Related Art

Typically, a "portable communication device" refers to an electronic device which a user can carry while performing wireless communications with another party. The configuration trends of such portable communication devices is toward miniaturizing, sliming, and decreasing the weight, as well as improving gripping while considering the desired portability of the device. Further configuration trends are toward providing multimedia with which more various functions can be pursued. Accordingly, portable communication devices are evolving into small, light-weight multi-function communication devices, and are being continuously improved to adapt to various multimedia or Internet environments. Also, such portable communication devices are being recognized as necessities to always be carried, without regard to the age or sex of the user in all parts the world.

Popularized conventional portable communication devices are classified into several types by appearance. For example, according to the appearances, conventional portable communication devices are classified into bar type, flip type, and folder type communication devices. The bar type communication device designates a communication device in which a single housing is formed in a bar type, the flip type communication device designates a communication device in which a flip member is rotatably assembled with a bar type housing by a hinge apparatus, and the folder type communication device designates a communication device in which a folder member is rotatably assembled with a single bar type housing by a hinge apparatus so that the folder member can be folded over the housing.

Also, the portable communication devices may be classified according to wearing positions or methods into neck-wearable type and wrist type communication devices. The neck-wearable type communication device designates a portable communication device that can be carried by wearing the portable communication device around the user's neck using a string, and the wrist type communication device designates a portable communication device that can be carried by wearing the portable communication device around the user's wrist.

Also, regarding opening/closing methods of the devices, the portable communication devices may be further classified into rotation type and sliding type communication devices. The rotation type communication device designates a communication device in which two housings are rotatably assembled and are opened/closed while facing each other, and the sliding type communication device designates a communication device in which two housings are opened/closed by a sliding movement in a longitudinal direction. The variously classified portable communication devices described above are well known to those skilled in the art.

These conventional portable communication devices are further developing into advanced portable communication devices capable of enabling high-speed data communication in addition to a voice communication function. That is, in order to meet the customers' increasing demands, future portable communication devices will provide services using wireless communication technologies for transmitting data at a high data rate.

Recently, conventional portable communication devices have been provided with camera lenses, thereby popularizing the transmission of image signals. The popularized portable communication devices can now further perform visual communications or photographing functions using an external or built-in camera.

However, antenna devices used in the conventional portable communication devices have the following problems. In a case where the conventional portable communication device has a retractable antenna comprised of a helical antenna and a rod antenna as an antenna device, the user is inconveniently required to pull out the retracted rod antenna when reception sensitivity decreases, and retract the pulled-out rod antenna after a call. Further, when the portable communication device is carried in a pocket, the portability of the device is decreased due to the protrusion of the antenna device. Also, when the portable communication device is dropped, the external antenna is frequently damaged.

Also, in a case where the portable communication device has a fixed built-in type antenna device, when the antenna's reception sensitivity decreases due to geographical features, there is no way to cope with the decrease in reception sensitivity.

Accordingly, a need exists for a system and method for an improved antenna unit for portable communication devices.

SUMMARY OF THE INVENTION

An object of the present invention is to substantially solve at least the above problems and disadvantages, and to provide at least the advantages described in greater detail below. Accordingly, an object of the present invention is to provide a portable device including a variable built-in antenna of which the reception sensitivity can be adjusted by sliding the antenna up or down according to the reception sensitivity.

Another object of the present invention is to provide a portable device including a variable built-in antenna which is formed to slide according to reception sensitivity.

Another object of the present invention is to provide a portable device including a variable built-in antenna which is formed to linearly slide in a longitudinal direction of a main body.

Another object of the present invention is to provide a portable device including a variable built-in antenna which is simply opened/closed.

Another object of the present invention is to provide a portable device including a sliding variable built-in antenna which is formed to automatically, manually, or semi-automatically transfer power for sliding movement according to reception sensitivity.

According to one aspect of the present invention, a portable device is provided and comprises a main body, a variable built-in antenna which is assembled at a predetermined location of the main body and configured to slide up/down in a longitudinal direction of the main body according to antenna reception sensitivity, and an electrical connection device for signal transmission between the main body and the variable built-in antenna.

According to another aspect of the present invention, an electrical connection device of a portable device for signal transmission between a main body and a variable built-in antenna, which is configured to slide up/down with respect to the main body, is provided and comprises a fixed printed circuit board (PCB) mounted on the main body, a mobile antenna PCB mounted on the variable built-in antenna, and a connection device which transmits signals by slidably connecting a free end to the fixed PCB and an end to the mobile antenna PCB, wherein the free end slidingly contacts the fixed PCB according to the sliding movement of the mobile antenna PCB.

According to another aspect of the present invention, an electrical connection device of a portable device is provided and comprises a fixed printed circuit board (PCB), a mobile PCB, and a helical wire cable, both ends of which are fixed and electrically connected to the fixed PCB and the moving PCB, respectively. The helical wire cable is assembled along a moving direction of the mobile PCB so that a length thereof is variable.

According to another aspect of the present invention, an electrical connection device of a portable device is provided and comprises a fixed printed circuit board (PCB), a moving PCB which is slidingly guided on the fixed PCB, and a connection terminal, a free end of which is slidably connected to the fixed PCB and an end of which is connected to the moving PCB, and which is assembled along a moving direction of the moving PCB wherein the free end of which slidingly contacts the fixed PCB.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

Figure 1:
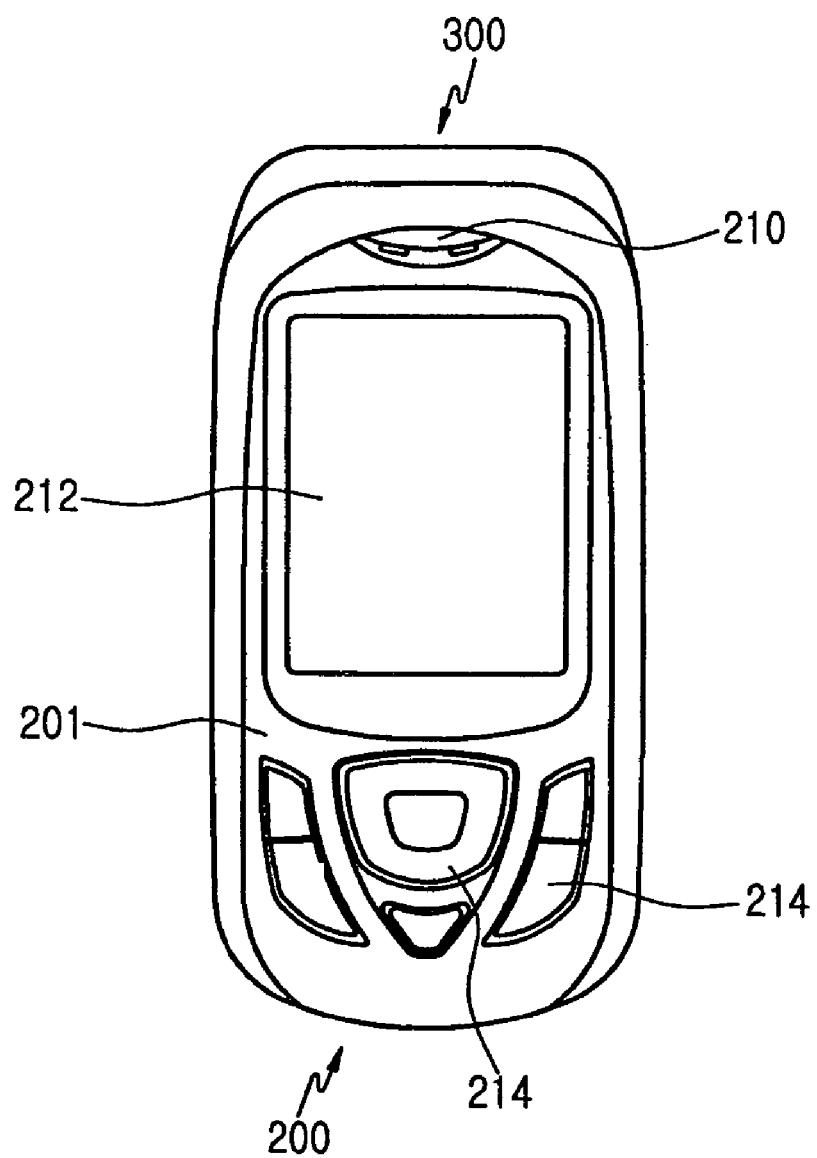
FIG. 1 is a front view of a sliding/swing type portable device having a variable built-in antenna according to an exemplary embodiment of the present invention.

A number of exemplary embodiments of the present invention will now be described herein below with reference to the accompanying drawings. In the drawings, the same or similar elements are denoted by the same reference numerals, even though they are depicted in different drawings. In the following description, functions or constructions that are well-known to those skilled in the art are omitted for clarity and conciseness.

As shown in FIGS. 1 through 6, a portable device according to an embodiment of the present invention comprises a main body 100, a variable built-in antenna 300 including an antenna housing, which is assembled with a top portion of the main body 100 and configured to slide in a longitudinal direction of the main body 100 while facing a main body's front surface 101, and a sliding housing 200, which opens/closes a predetermined portion of the main body's front surface 101 by linearly sliding along the longitudinal direction of the main body 100 while facing the main body's front surface 101.

As shown in FIG. 1, a number of features are disposed on a sliding housing's front surface 201, including a speaker unit 210, a display unit 212 neighboring the speaker unit 210, and a first keypad 214 which neighbors the display unit 212 and comprises a plurality of keys.

The variable built-in antenna 300 designates an antenna unit of which reception sensitivity varies according to whether the antenna unit installed in the antenna housing is slid upward. Preferably, it is not necessary to limit the deployment of the variable built-in antenna 300 to the top portion of the main body 100. Alternatively, the variable built-in antenna 300 may be assembled with a bottom portion of the main body 100, or may be assembled with a top or bottom portion of the sliding housing 200.

Figure 2:
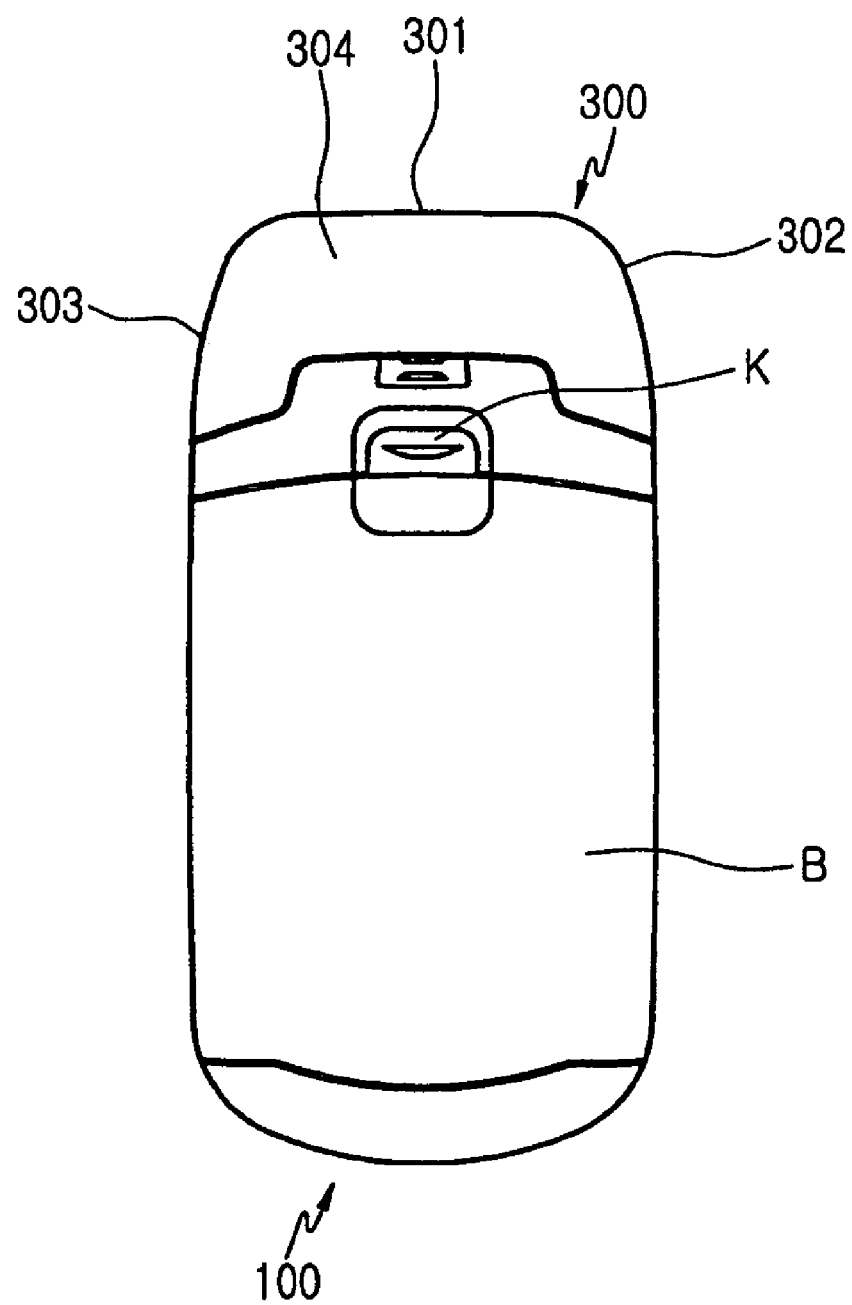
FIG. 2 is a rear view of the sliding/swing type portable device shown in FIG. 1.
Figure 3:
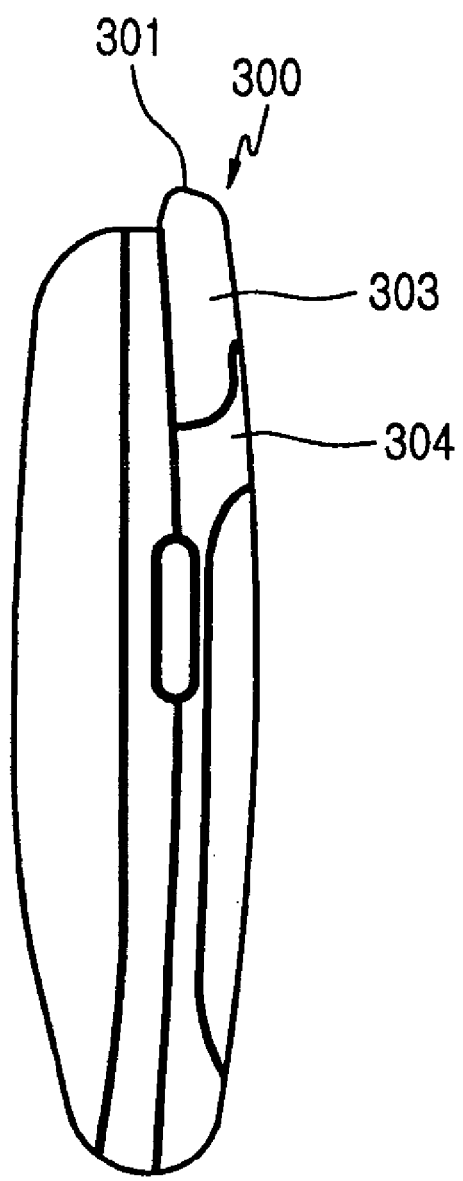
FIG. 3 is a side elevational view of the sliding/swing type portable device shown in FIG. 1.

As shown in FIGS. 2 and 3, the variable built-in antenna 300 comprises the antenna housing having an edge portion 301, both side portions 302 and 303, and a rear portion 304, all of which are united as one body to fully cover the top portion of the main body 100. One or more of the side portions 302 and 303 can be provided with a projection (not shown) to facilitate a sliding movement of the antenna 300 along the main body 100.

As shown in FIG. 2, a number of features are disposed on the main body's rear surface including the rear portion 304 of the variable built-in antenna 300, a battery locking knob K neighboring the rear portion 304, and a battery pack B neighboring the battery locking knob K.

Figure 4:
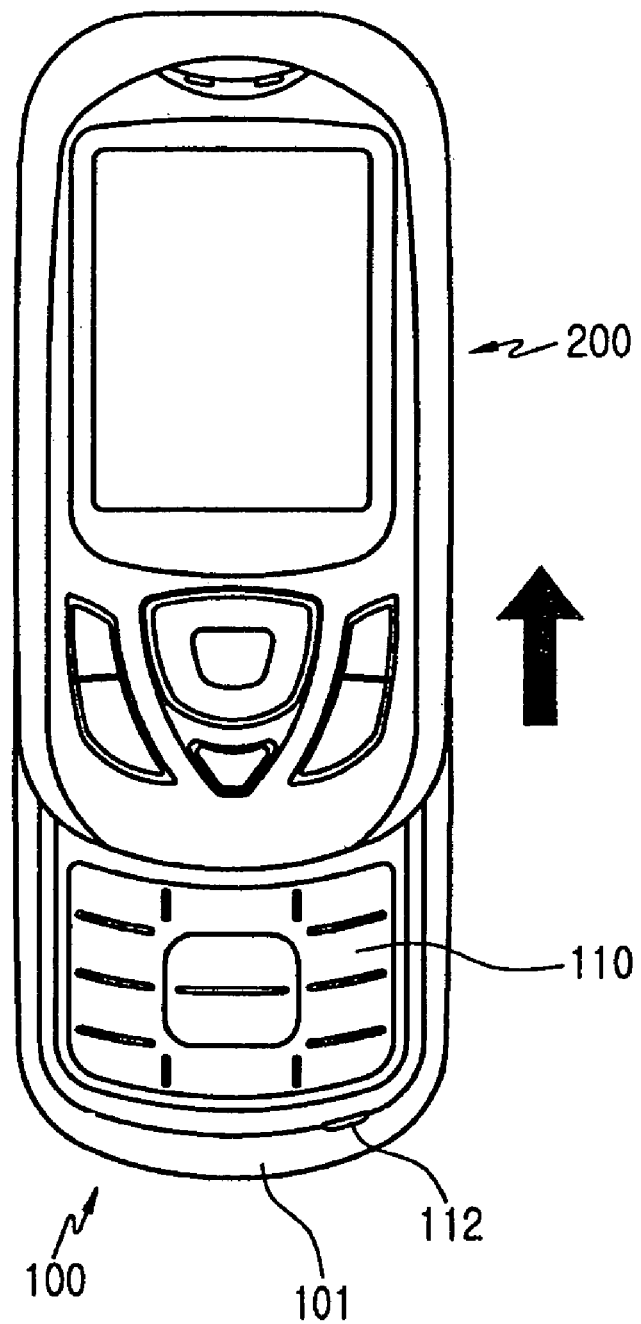
FIG. 4 is a front view of the sliding/swing type portable device shown in FIG. 1 in a state wherein a sliding housing is slidingly moved according to an exemplary embodiment of the present invention.
Figure 5:
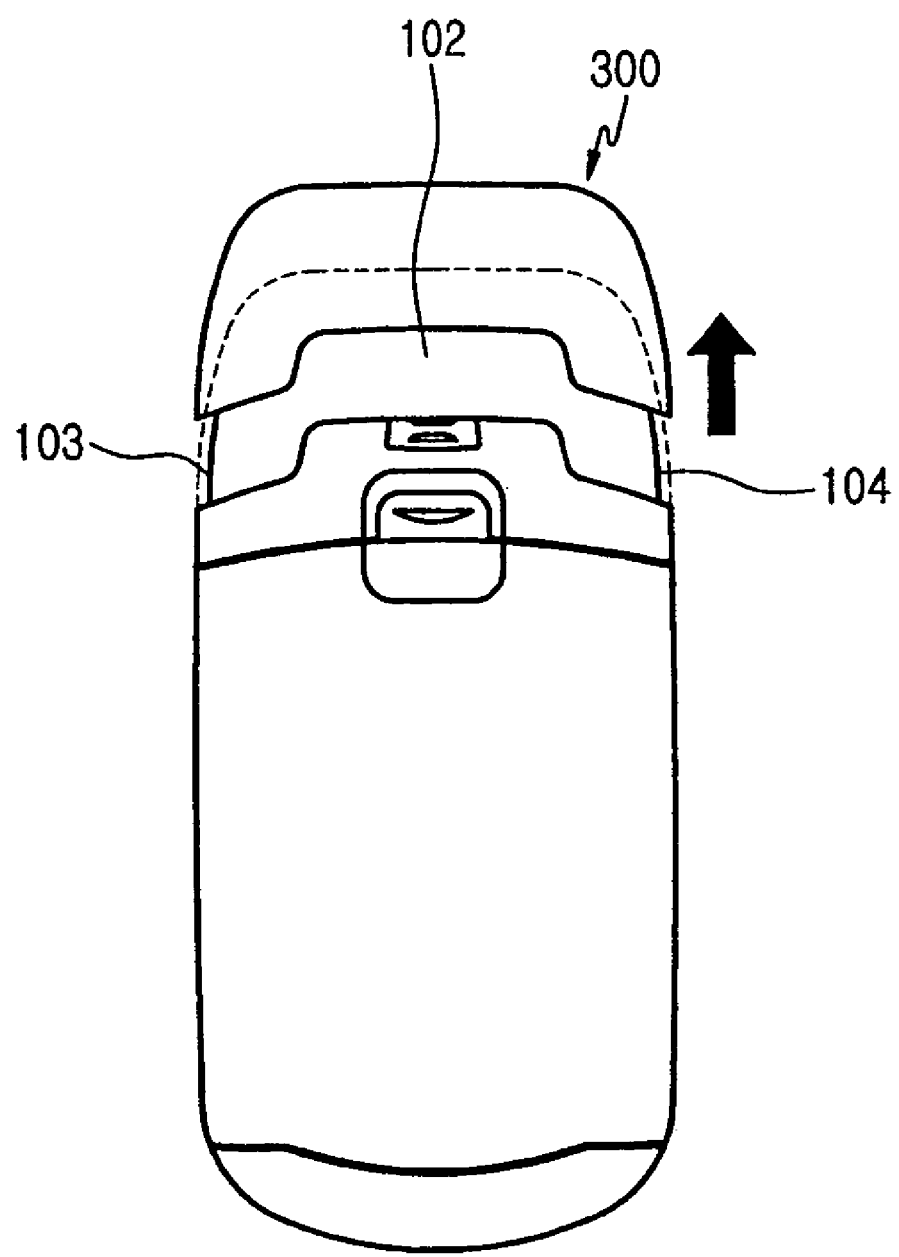
FIG. 5 is a rear view of the sliding/swing type portable device shown in FIG. 4 in a state wherein the variable built-in antenna is slid out according to an exemplary embodiment of the present invention.
Figure 6:
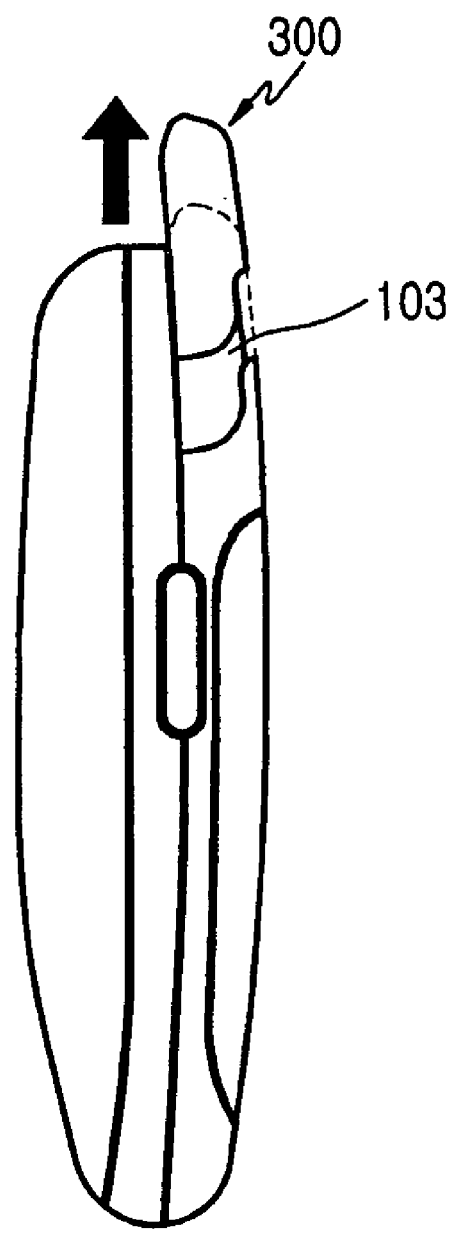
FIG. 6 is a side elevational view of the sliding/swing type portable device shown in FIG. 5.

As shown in FIG. 4, a number of features are disposed on the main body's front surface 101 including a second keypad 110 which comprises a plurality of keys being exposed when the sliding housing 200 is slid upward, and a microphone unit 112 neighboring the second keypad 110.

Preferably, the variable built-in antenna 300 can be formed such that it can be slid in any one of an automatic, manual, and semiautomatic modes. The variable built-in antenna 300 is slid according to antenna reception sensitivity, and a power source for the sliding movement can be provided in a number of different ways according to the operation mode of the variable built-in antenna 300.

In the automatic-mode configuration, the variable built-in antenna 300 senses its reception sensitivity and automatically slides upward or downward with respect to the top portion of the main body 100 according to the sensed reception sensitivity. A motor (not shown) and a decelerating module (not shown) for reducing motor power can be used as an automatic power source, and a guide (not shown) or guide rail (not shown) is provided to determine a sliding direction of the variable built-in antenna 300. In addition, a separate operation key (not shown) is provided so that the variable built-in antenna 300 can be automatically slid upward or downward by the automatic power source in response to a user pressing or releasing the operation key.

In the manual-mode configuration, upon notification of low antenna reception sensitivity through the display unit 212, a user can fully slide up/down the variable built-in antenna 300 by manual force. A guide or guide rail is provided to determine the sliding direction of the variable built-in antenna 300.

In the semiautomatic-mode configuration, when the antenna reception sensitivity is low, the user can slide up/down the variable built-in antenna 300 by providing sliding power thereto only in an initial stage. That is, the variable built-in antenna 300 is provided with the initial triggering sliding power from the user, and the remaining main sliding power from an elastic member (not shown). Similarly, a guide or guide rail is provided to determine the sliding direction of the variable built-in antenna 300. The elastic member can comprise a torsion spring, a coil spring, or a plate spring. In addition, the variable built-in antenna 300 can comprise a separate operation key (not shown) so that the user can release a locking state to fully slide up the variable built-in antenna 300 by simply pushing the operation key.

The variable built-in antenna 300 further comprises an electrical connection device (not shown) for transmitting signals before and after the sliding movement. The electrical connection device will be described in greater detail below.

In this way, the user can conveniently slide up/down the variable built-in antenna 300 of the portable device according to the antenna reception sensitivity.

Figure 7:
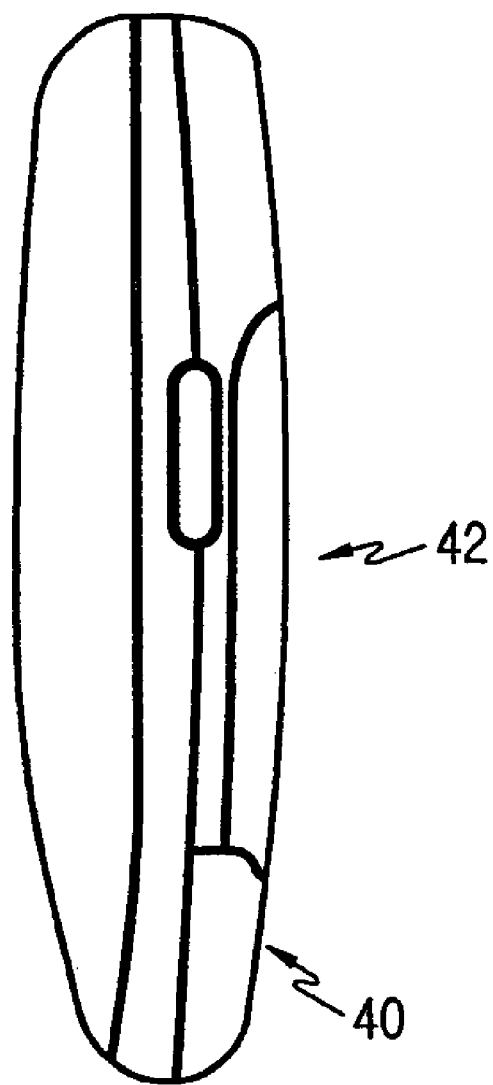
FIG. 7 is a side elevational view of a sliding/swing type portable device of which a variable built-in antenna is assembled with a bottom portion of a main body according to an exemplary embodiment of the present invention.
Figure 8:
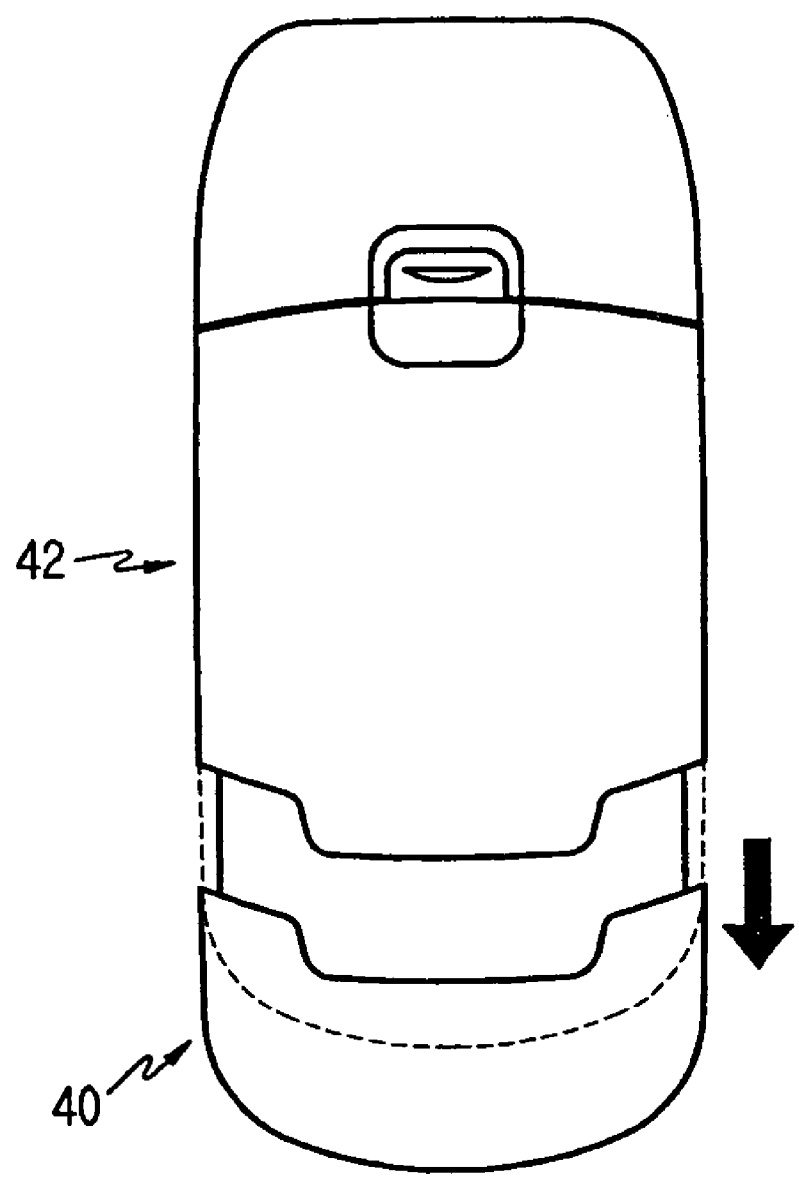
FIG. 8 is a rear view of the sliding/swing type portable device shown in FIG. 7.

FIGS. 7 and 8 illustrate a state wherein a variable built-in antenna 40 is assembled with a bottom portion of a main body 42 according to an exemplary embodiment of the present invention. The variable built-in antenna 40 slidingly moves on the bottom portion of the main body 42 according to its reception sensitivity.

Various types of portable devices in which variable built-in antennas according to embodiments of the present invention are provided will now be described in greater detail. In a manner substantially the same as described above, the following exemplary portable devices are formed such that their variable built-in antennas can move in any one of an automatic, manual and semiautomatic mode, and the substantially same guide members and electrical connection mechanisms are provided therein.

FIGS. 9 through 12 illustrate folder type portable devices in which variable built-in antennas according to embodiments of the present invention are provided.

Figure 9:
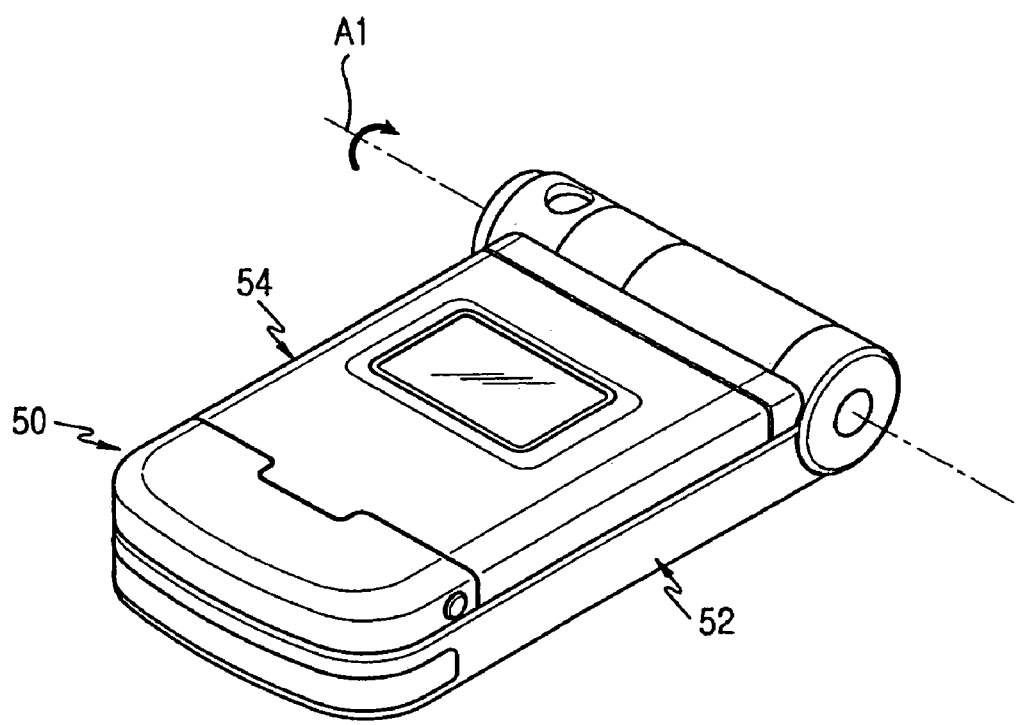
FIG. 9 is a perspective view of a folder type portable device of which a variable built-in antenna is assembled with a top portion of a folder according to an exemplary embodiment of the present invention.
Figure 10:
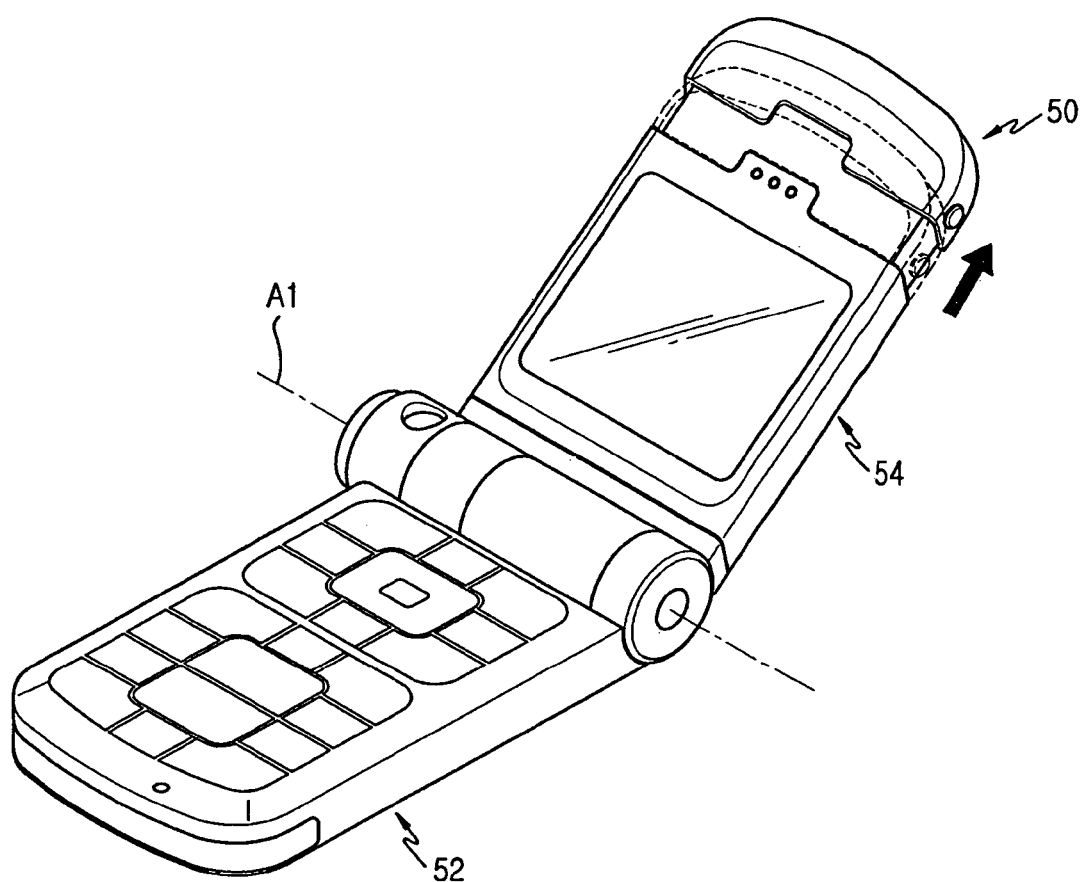
FIG. 10 is a perspective view of the folder type portable device shown in FIG. 9 in a state wherein the sliding variable built-in antenna is slid out.

FIGS. 9 and 10 illustrate a folder type portable device in which a variable built-in antenna 50 is assembled with a top portion of a folder 54 according to an exemplary embodiment of the present invention. The folder type portable device comprises a main body 52, the folder 54, which is rotatably opened/closed with respect to the main body 52 on a hinge axis A1, the variable built-in antenna 50, which is assembled to face the top portion of the folder 54 and configured to slide up/down in a longitudinal direction of the folder 54 according to antenna reception sensitivity, and an electrical connection device (not shown) for signal transmission between the folder 54 and the variable built-in antenna 50. The electrical connection device is described in greater detail below.

Figure 11:
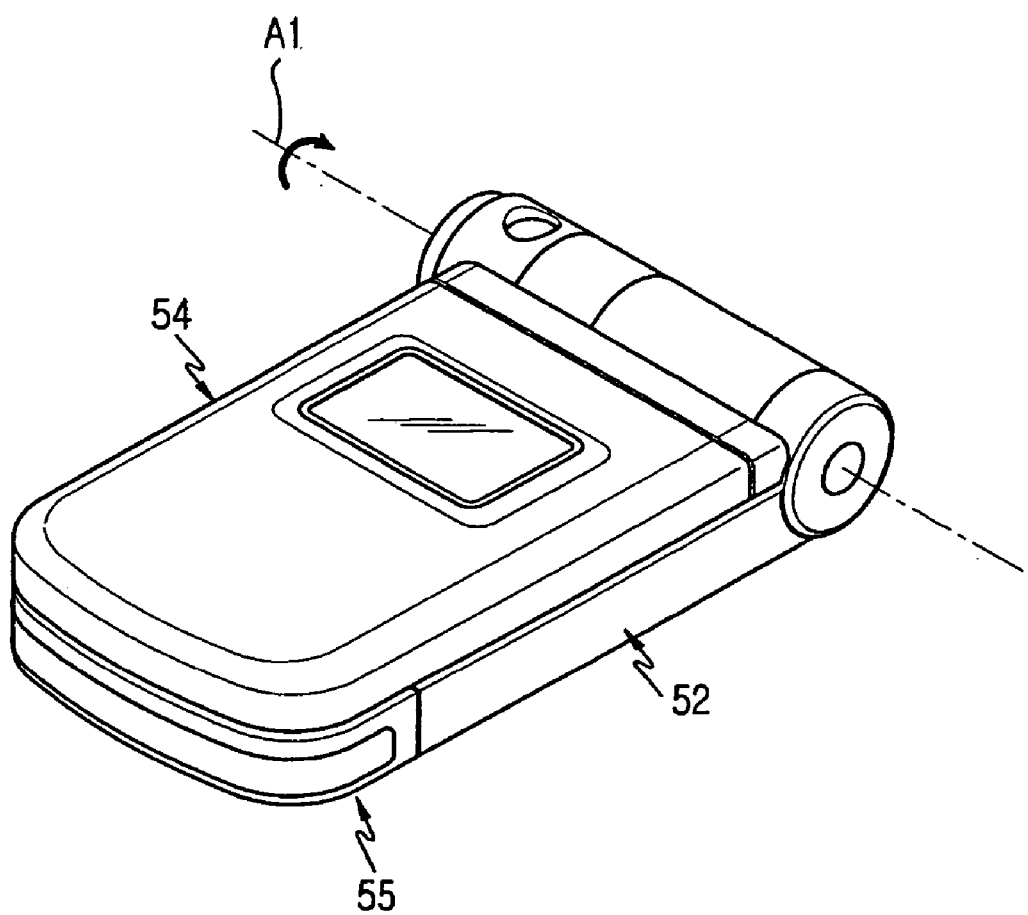
FIG. 11 is a perspective view of a folder type portable device of which a variable built-in antenna is assembled with a bottom portion of a main body according to an exemplary embodiment of the present invention.
Figure 12:
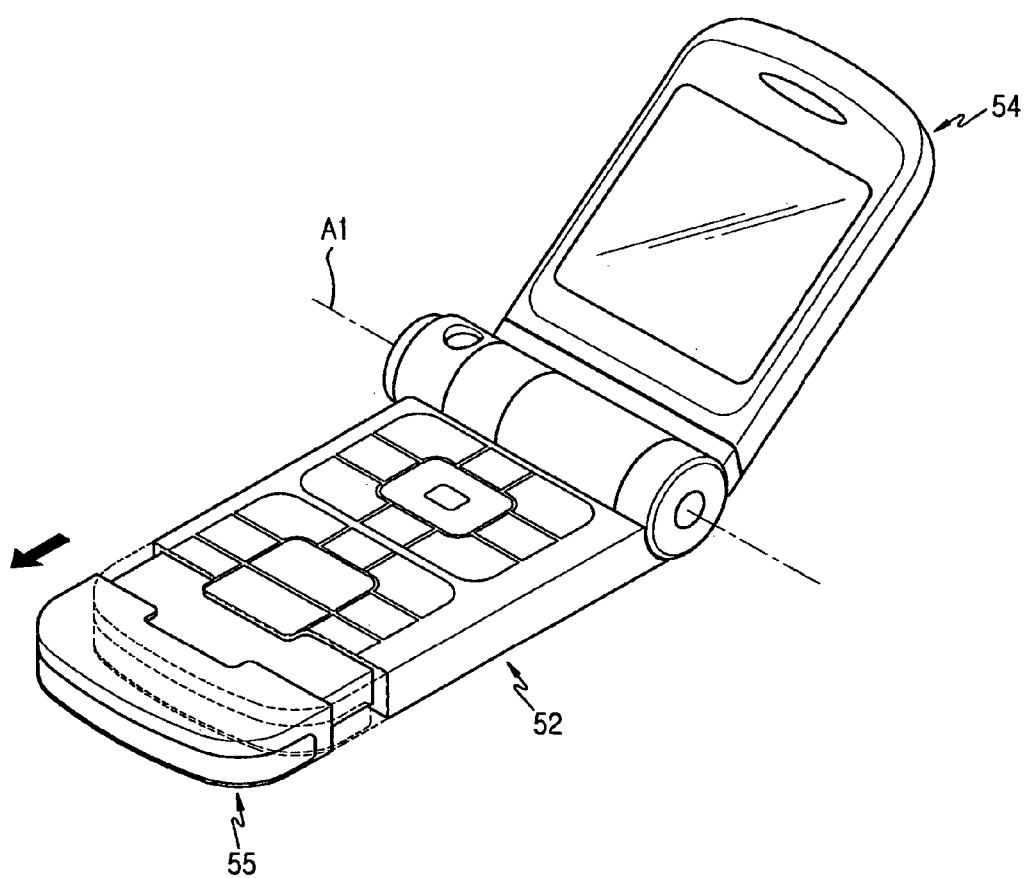
FIG. 12 is a perspective view of the folder type portable device shown in FIG. 11 in a state wherein the variable built-in antenna is slid out.

FIGS. 11 and 12 illustrate a folder type portable device in which a variable built-in antenna 55 is assembled with a bottom portion of the main body 52 according to an exemplary embodiment of the present invention. FIG. 11 illustrates a state wherein the variable built-in antenna 55 is retracted into the bottom portion of the main body 52, and FIG. 12 illustrates a state wherein the variable built-in antenna 55 is fully slid out from the bottom portion of the main body 52.

Figure 13:
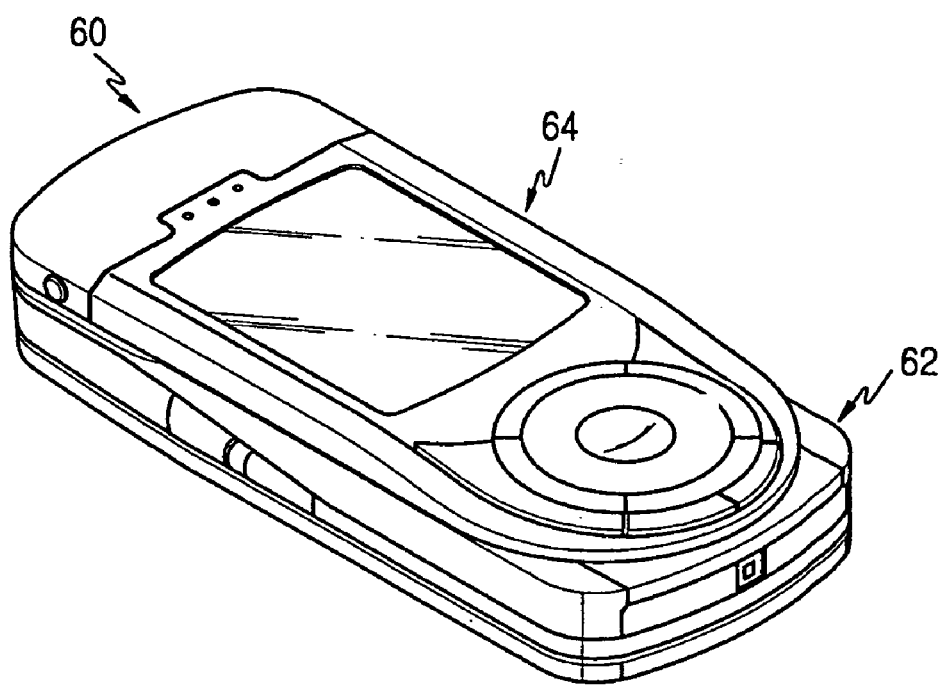
FIG. 13 is a perspective view of a swing type portable device of which a variable built-in antenna is assembled with a top portion of a swing housing according to an exemplary embodiment of the present invention.
Figure 14:
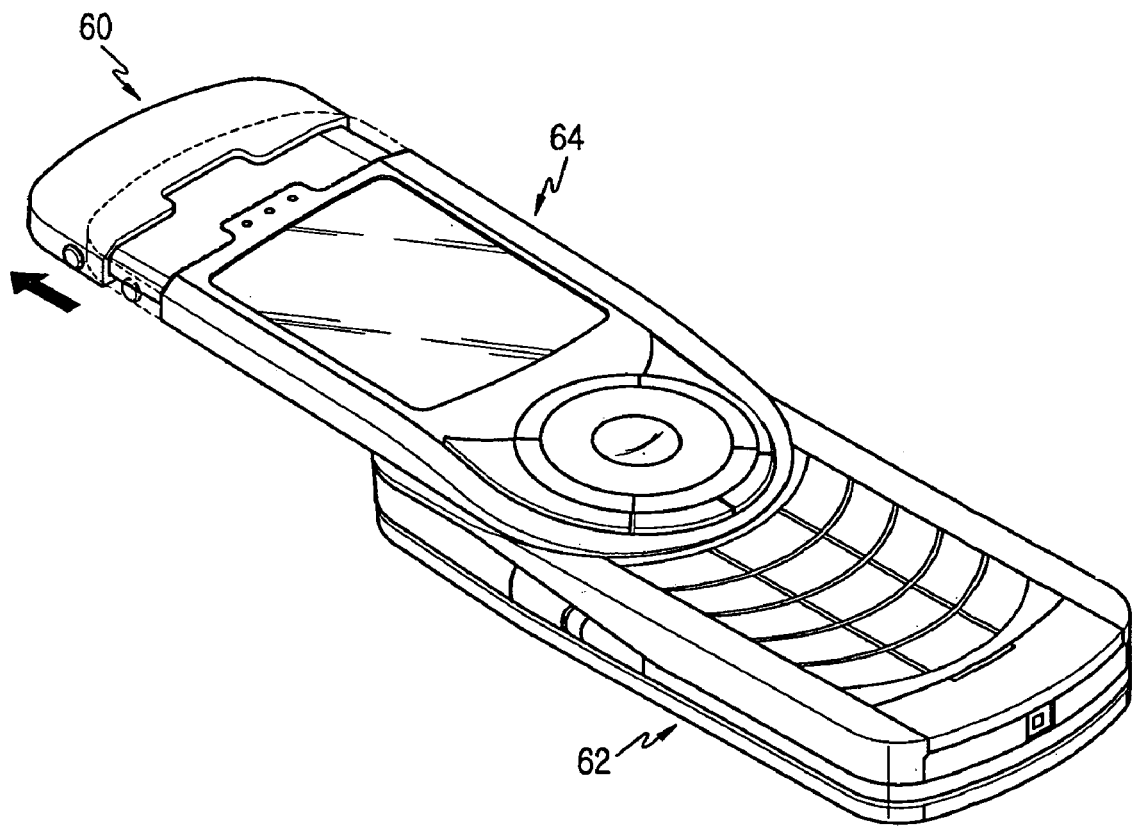
FIG. 14 is a perspective view of the swing type portable device shown in FIG. 13 in a state wherein the variable built-in antenna is slid out.
Figure 15:
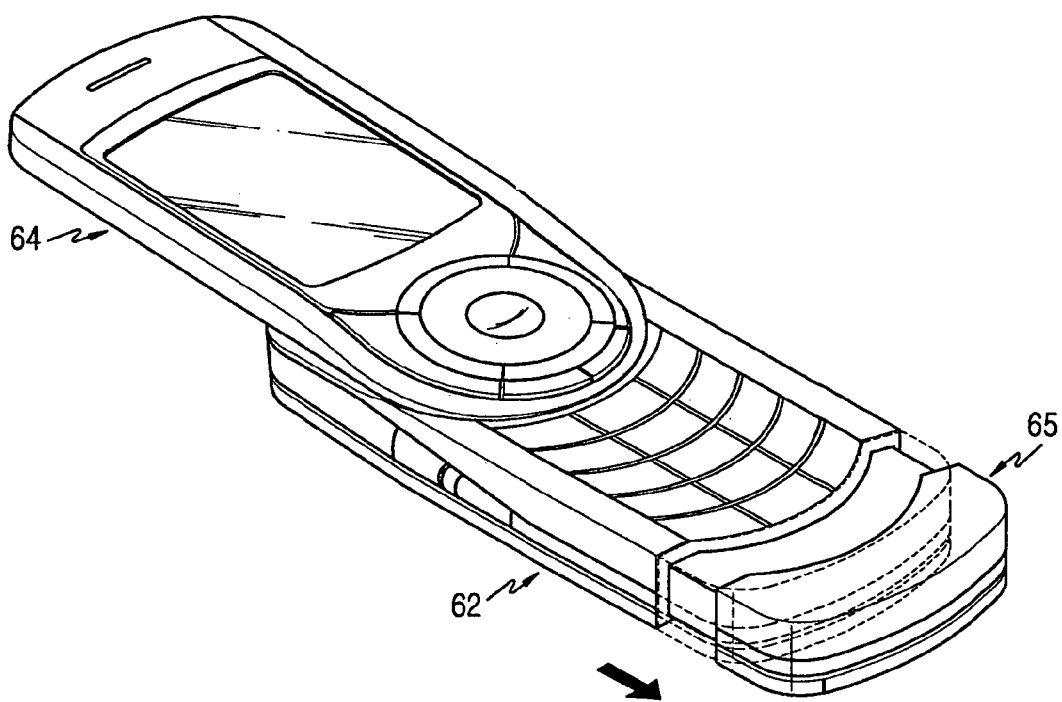
FIG. 15 is a perspective view of a swing type portable device of which a variable built-in antenna is assembled with a bottom portion of a main body according to an exemplary embodiment of the present invention.

FIGS. 13 through 15 illustrate swing type portable devices in which variable built-in antennas according to embodiments of the present invention are provided. FIGS. 13 and 14 illustrate a swing type portable device in which a variable built-in antenna 60 is assembled with a top portion of a swing housing 64 according to an exemplary embodiment of the present invention. Referring to FIGS. 13 and 14, the swing type portable device comprises a main body 62, the swing housing 64, which is rotatably opened/closed on a hinge axis while facing a front surface of the main body 62, the variable built-in antenna 60, which is assembled to face the top portion of the swing housing 64 and configured to slide up/down in a longitudinal direction of the swing housing 64 according to antenna reception sensitivity, and an electrical connection device (not shown) for signal transmission between the swing housing 64 and the variable built-in antenna 60. The electrical connection device is described in greater detail below. FIG. 14 illustrates a state wherein the variable built-in antenna 60 is fully slid upward after the swing housing 64 swings 180° against the main body 62.

FIG. 15 illustrates a swing type portable device in which a variable built-in antenna 65 is assembled with a bottom portion of the main body 62 according to an exemplary embodiment of the present invention. FIG. 15 shows a state wherein the variable built-in antenna 65 is fully slid out from the bottom portion of the main body 62.

Figure 16:
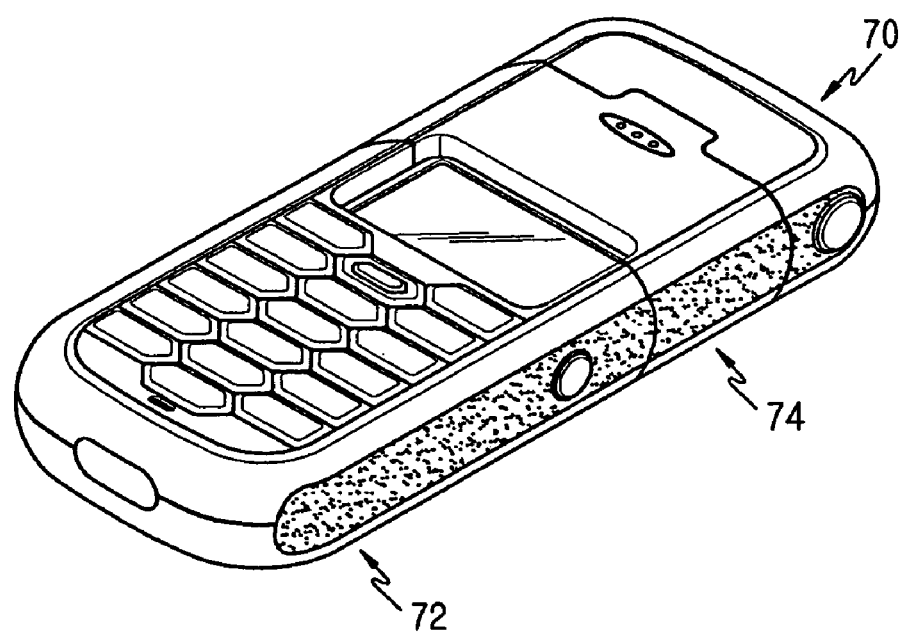
FIG. 16 is a perspective view of a unidirectional sliding type portable device of which a variable built-in antenna is assembled with a top portion of an upper sliding housing according to an exemplary embodiment of the present invention.
Figure 17:
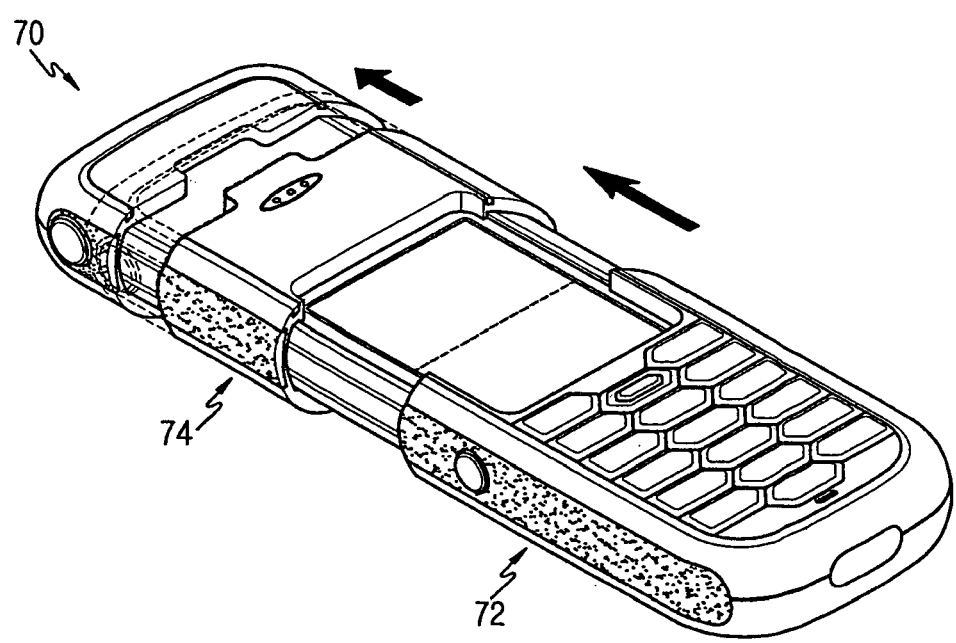
FIG. 17 is a perspective view of the unidirectional sliding type portable device shown in FIG. 16 in a state wherein the variable built-in antenna is slid out.

FIGS. 16 through 19 illustrate sliding type portable devices in which variable built-in antennas according to embodiments of the present invention are provided. FIGS. 16 and 17 illustrate a sliding type portable device in which a variable built-in antenna 70 is assembled with a top portion of a sliding housing 74 according to an exemplary embodiment of the present invention. Referring to FIGS. 16 and 17, the sliding type portable device comprises a main body 72, the sliding housing 74, which is assembled around a predetermined portion of the main body 72 and configured to slide up/down in a longitudinal direction of the main body 72, the variable built-in antenna 70, which is assembled to face the top portion of the sliding housing 74 and configured to slide up/down in a longitudinal direction of the sliding housing 74 according to antenna reception sensitivity, and an electrical connection device (not shown) for signal transmission between the sliding housing 74 and the variable built-in antenna 70. The electrical connection device will be described in greater detail below.

FIG. 16 shows a state wherein the variable built-in antenna 70 is fully retracted, and FIG. 17 shows a state wherein the variable built-in antenna 70 is fully slid out. The decision as to whether to slide the variable built-in antenna 70 up or down is determined according to the antenna reception sensitivity.

Figure 18:
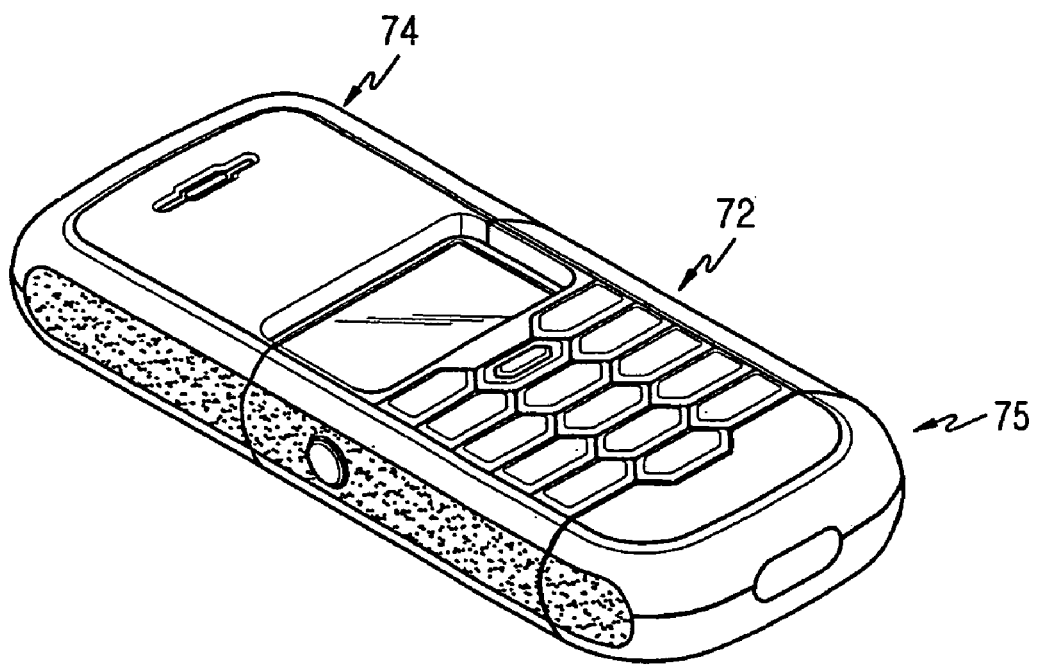
FIG. 18 is a perspective view of a unidirectional sliding type portable device of which a variable built-in antenna is assembled with a bottom portion of a lower sliding housing according to an exemplary embodiment of the present invention.
Figure 19:
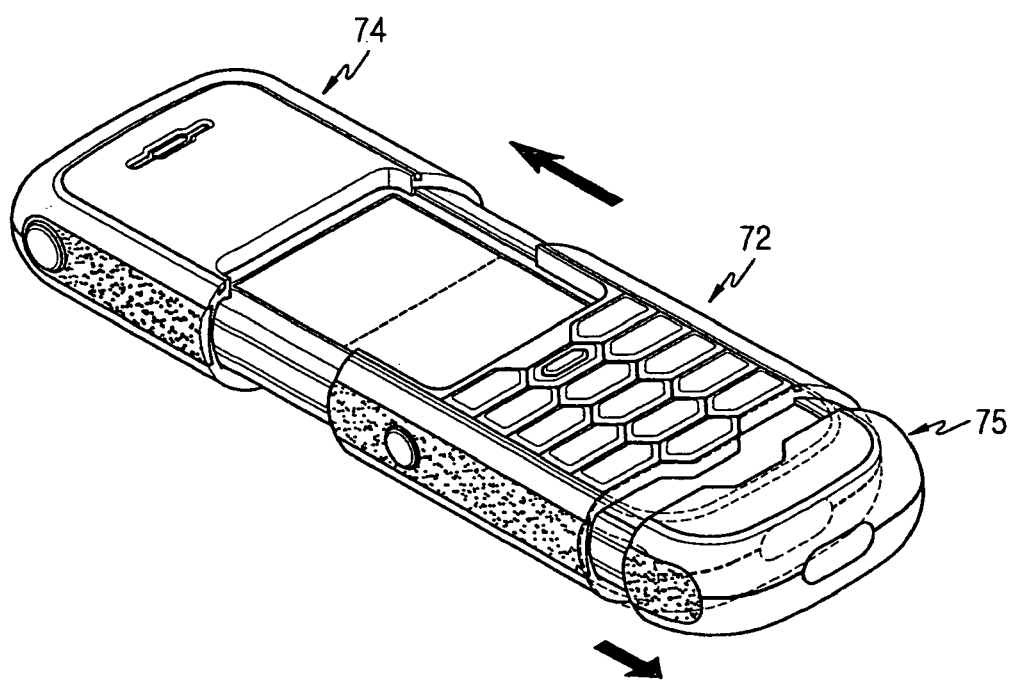
FIG. 19 is a perspective view of the unidirectional sliding type portable device shown in FIG. 18 in a state wherein the variable built-in antenna is slid out.

FIGS. 18 and 19 illustrate a sliding type portable device in which a variable built-in antenna 75 is assembled with a bottom portion of the main body 72 according to an exemplary embodiment of the present invention. FIG. 18 shows a state wherein the variable built-in antenna 75 is fully retracted into the bottom portion of the main body 72, and FIG. 17 shows a state wherein the variable built-in antenna 75 is fully slid out from the bottom portion of the main body 72.

Configurations of the electrical connection devices will now be described in greater detail. The electrical connection devices can be adapted to any number of embodiments of the present invention, including all of the automatic-mode, manual-mode, and semiautomatic-mode variable built-in antennas according to embodiments of the present invention as described above. The electrical connection devices have an antenna function and perform an auxiliary antenna function as described in greater detail below.

Figure 20A:
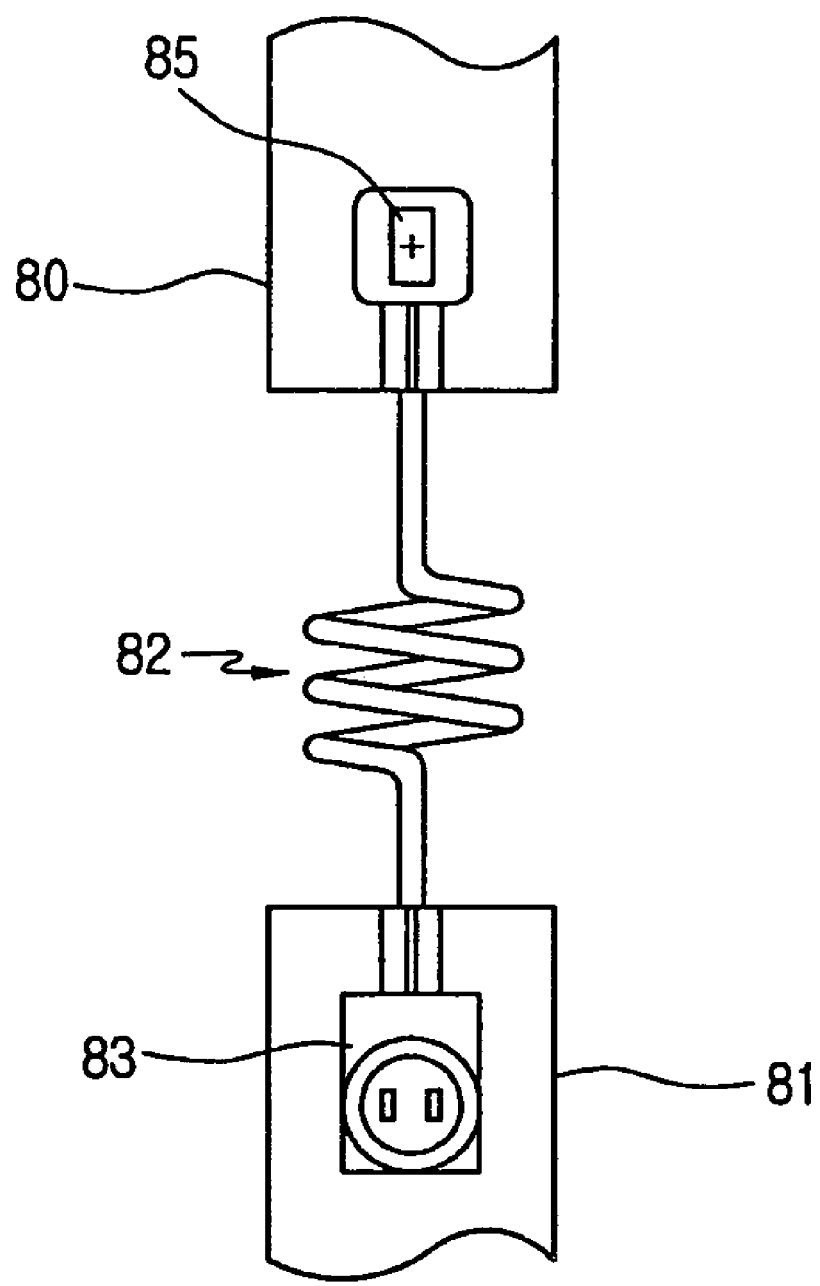
FIG. 20A is a front view of an electrical connection device of a variable built-in antenna according to an exemplary embodiment of the present invention.
Figure 20B:
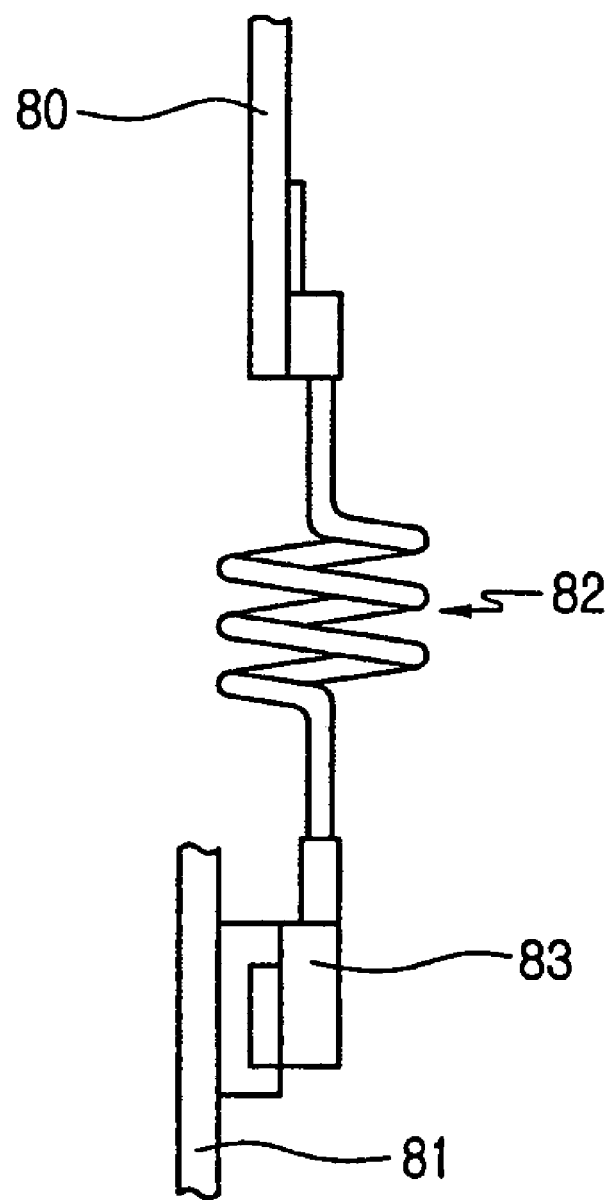
FIG. 20B is a side elevational view of the electrical connection device shown in FIG. 20A.
Figure 21:
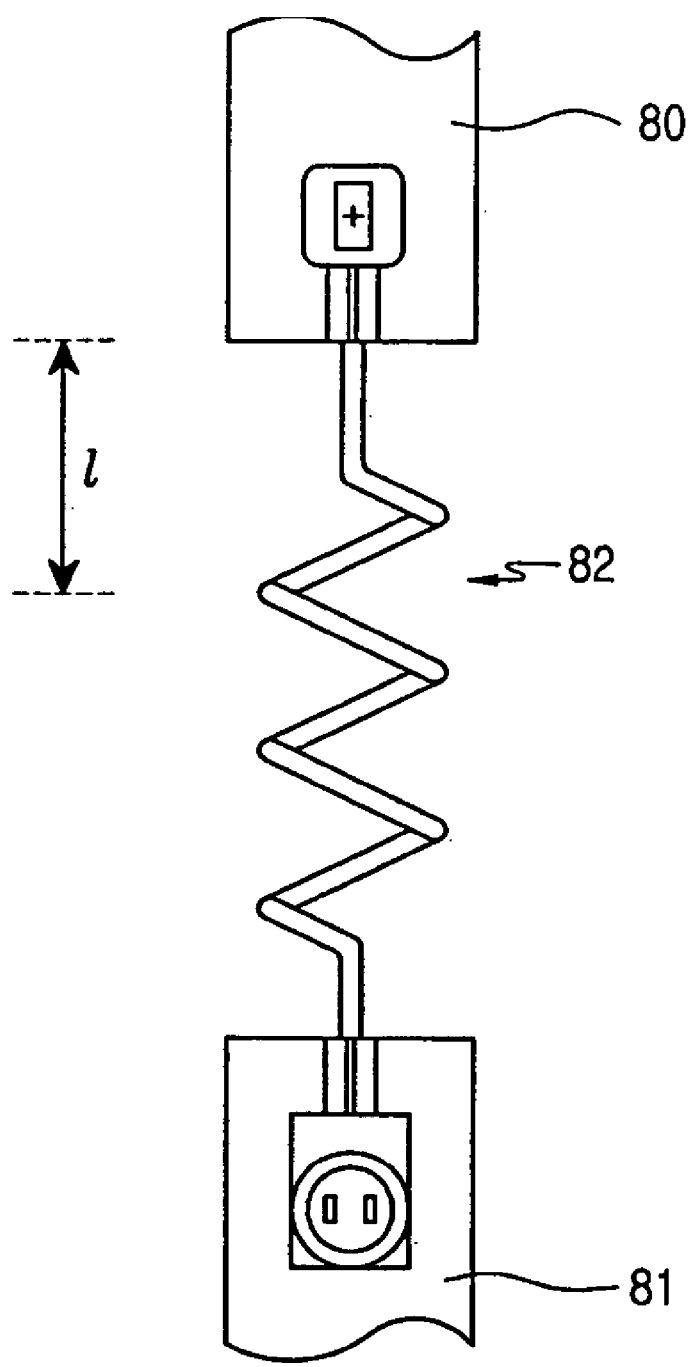
FIG. 21 is a front view of the electrical connection device shown in FIG. 20A in a state wherein the variable built-in antenna is slid out.

Referring to FIGS. 20A through 21, a connection device 82 according to an exemplary embodiment of the present invention is provided to transmit electrical signals between a fixed printed circuit board (PCB) 81 mounted on a main body, which is a fixed object, and a mobile antenna PCB 80 mounted on a variable built-in antenna, which is a mobile object. Specifically, for the signal transmission, an end of the connection device 82 is coupled to the fixed PCB 81 and an end is coupled to the mobile antenna PCB 80, and a length of the connection device 82 varies according to the sliding movement of the mobile antenna PCB 80.

The connection device 82 is comprised of a cable, such as a wire cable, and formed in a spiral shape to allow a variation in its length. Therefore, the connection device 82 is lengthened according to the sliding movement of the mobile antenna PCB 80. FIG. 20A shows a state before the mobile antenna PCB 80 is slid outward, and FIG. 21 shows a state wherein the connection device 82 is lengthened after the mobile antenna PCB 80 is fully slid outward. Referring to FIG. 20A, reference numeral 85 designates a surface mount device (SMD) terminal, and reference numeral 83 designates a wire connector.

Figure 22A:
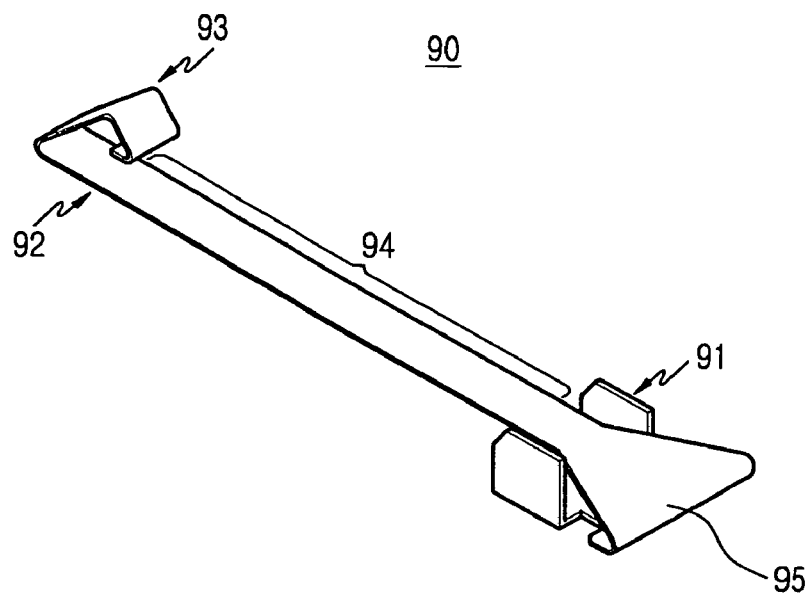
FIGS. 22A and 22B are perspective views of an electrical connection device of a variable built-in antenna according to another exemplary embodiment of the present invention.
Figure 22B:
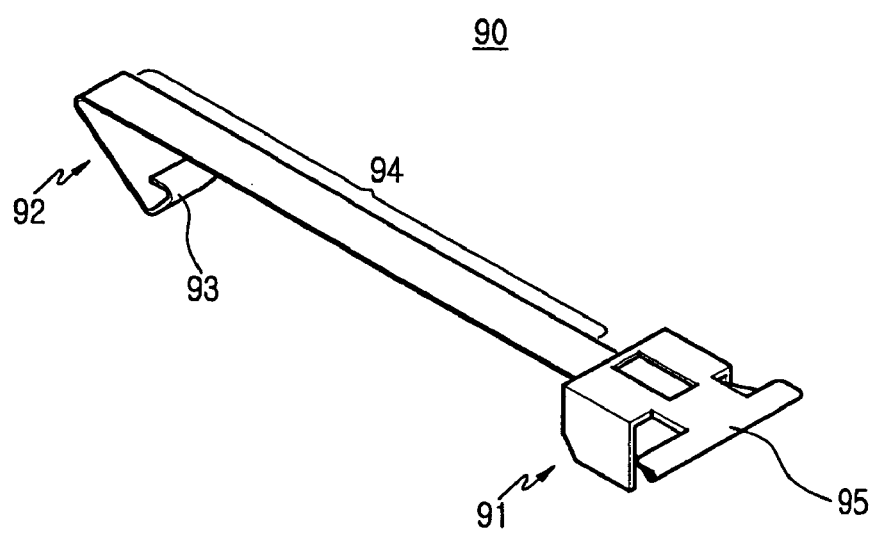
Figure 23:
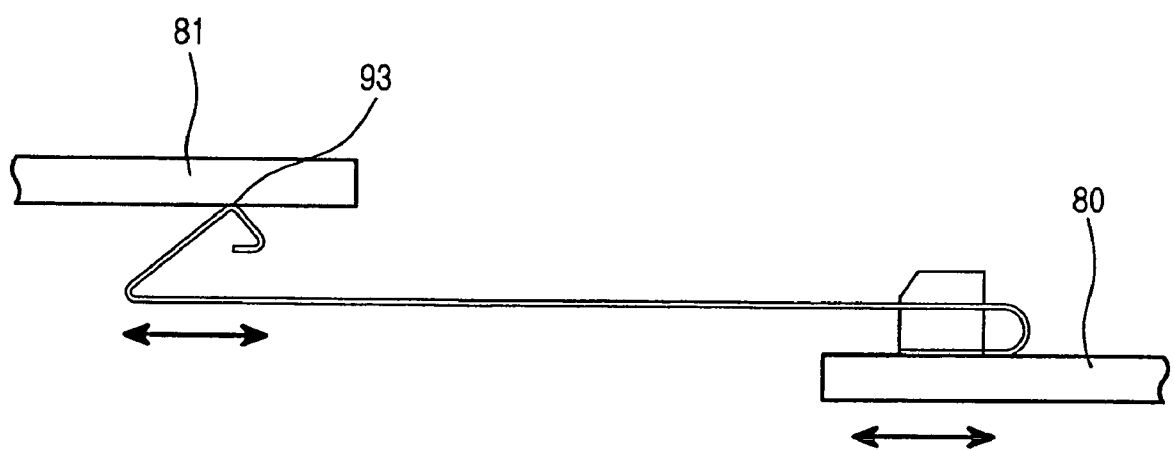
FIG. 23 is a side elevational view of the electrical connection device shown in FIG. 22A in a state wherein the variable built-in antenna is slid out.

FIGS. 22A through 23 illustrate an electrical connection device according to another exemplary embodiment of the present invention. A connection device 90 provides a terminal for transmitting electrical signals between the fixed PCB 81 mounted on a main body, which is a fixed object, and the mobile antenna PCB 80 mounted on a variable built-in antenna, which is a mobile object. Specifically, for the signal transmission, a free end of the connection device 90 is slidably coupled to the fixed PCB 81 and an end is coupled with the mobile antenna PCB 80. Specifically, a free end 92 of the connection device 90 slidingly contacts the fixed PCB 81 while the mobile antenna PCB 80 slidingly moves.

The connection device 90 is comprised of a power feeding terminal, which comprises a fixed end 91 connected to the mobile antenna PCB 80, the free end 92 having a first bending portion 93, which is provided in a shape bent more than once and slidingly contacting the fixed PCB 81, and an intermediate portion 94, which is formed between the fixed end 91 and the free end 92 and provides tension. Preferably, a second bending portion 95 is provided to the fixed end 91 and is tapered to reinforce elasticity provided to the free end 92. Since the power feeding terminal has a degree of elasticity, the free end 92 can be biased to always contact the fixed PCB 81 regardless of the sliding movement of the mobile antenna PCB 80.

Figure 24:
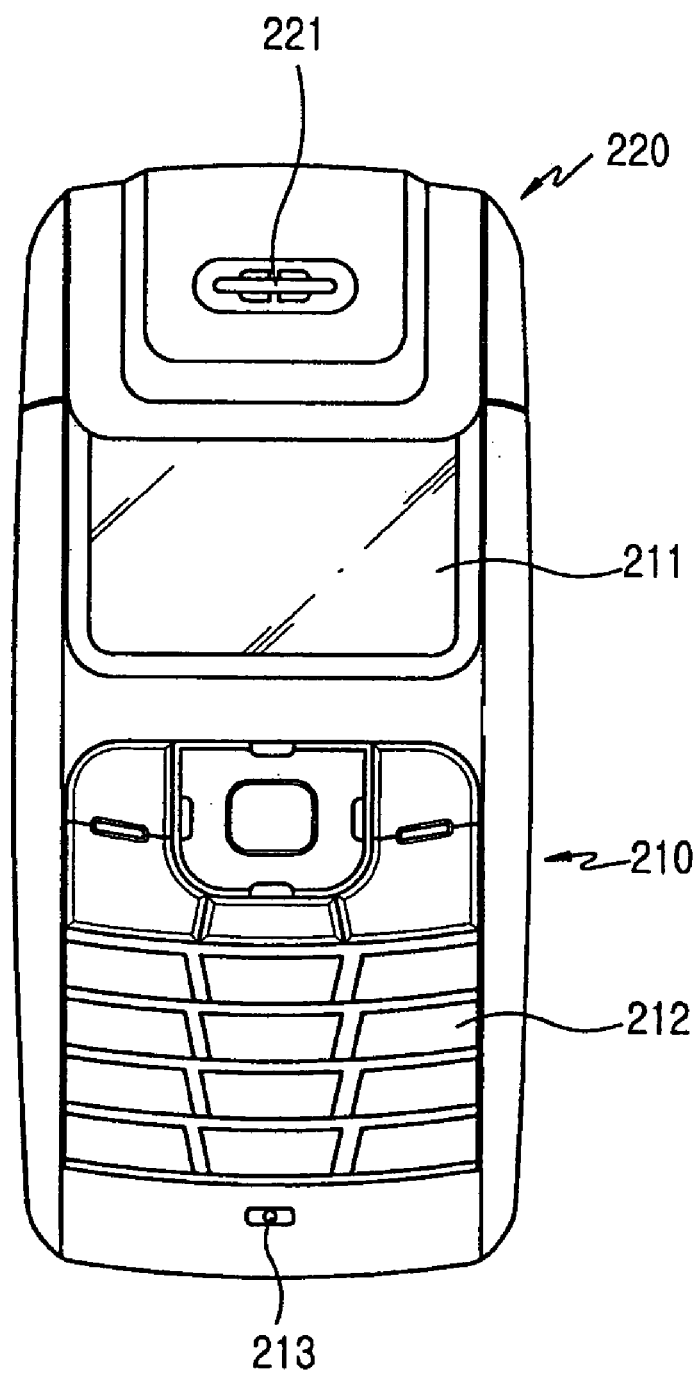
FIG. 24 is a front view of a sliding-up type portable device having an antenna unit according to an exemplary embodiment of the present invention.
Figure 25:
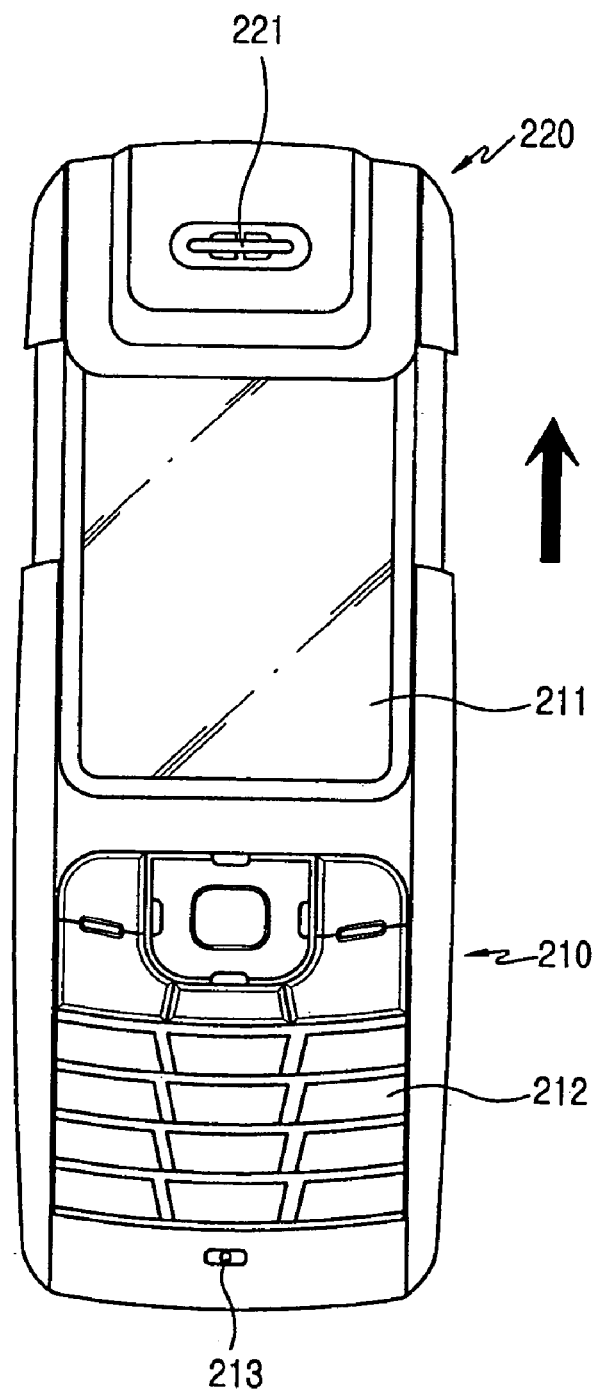
FIG. 25 is a front view of the sliding-up type portable device shown in FIG. 24 in a state wherein the antenna unit is slid upward.

Referring to FIGS. 24 and 25, a sliding-up type portable device providing an antenna unit according to an exemplary embodiment of the present invention comprises a main body 210 and a sliding housing 220, which is configured to slide up/down with respect to a top portion of the main body 210. A number of features are disposed on the main body 210 including a display unit 211, a plurality of keys 212, and a microphone unit 213. On the sliding housing 220 are mounted a speaker unit 221 and the antenna unit described in greater detail below. FIG. 25 shows a state wherein the sliding housing 220 of the sliding-up type portable device providing the antenna unit is fully slid upward, and FIG. 24 shows a state wherein the sliding housing 220 is fully slid downward.

Figure 26:
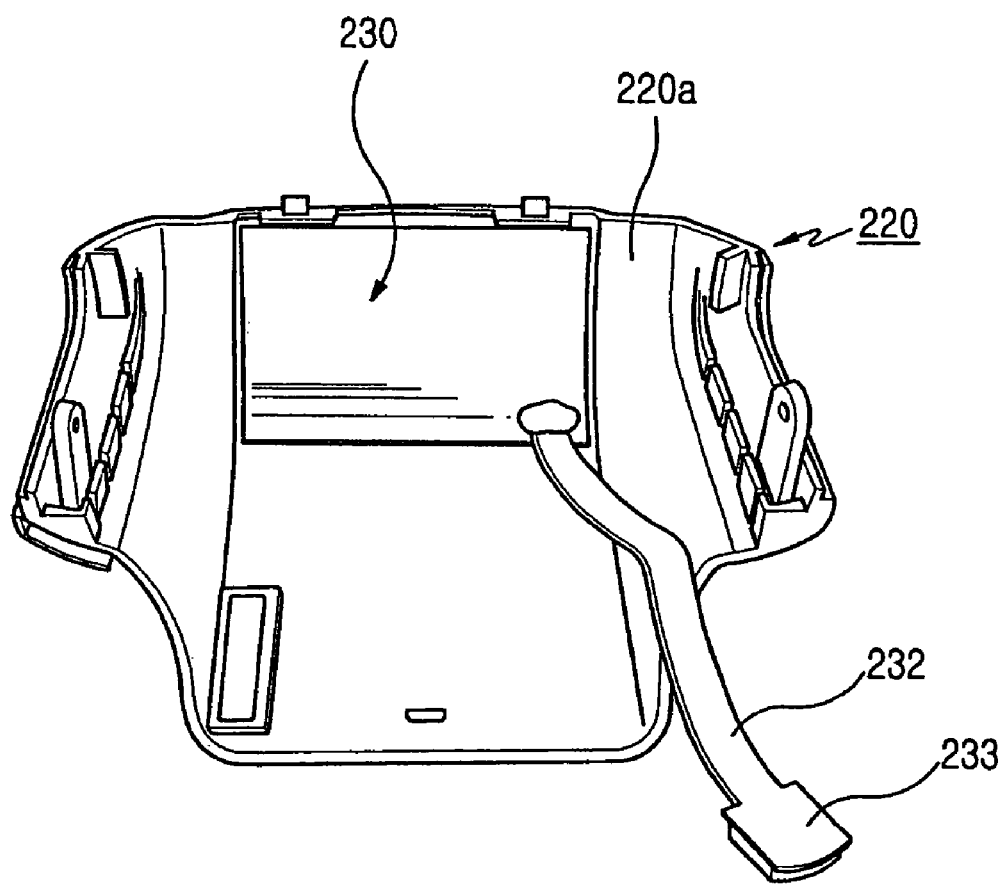
FIG. 26 is a perspective view of an antenna unit assembled with a sliding housing according to an exemplary embodiment of the present invention.

Referring to FIG. 26, the antenna unit provided by the sliding-up type portable device comprises a first antenna flexible printed circuit (FPC) 230 mounted on an inside surface 220a of the sliding housing 220, and a second antenna FPC 232, which is mounted between the sliding housing 220 and the main body 210 and which elastically responds to the sliding of the sliding housing 220. The first antenna FPC 230 is mounted on the sliding housing's inside surface 220a by attaching one surface of the first antenna FPC 230 to the sliding housing's inside surface 220a, and the second antenna FPC 232 is connected to the main body 210 by plugging a free end 233 of the second antenna FPC 232 into a plug connector 235 included in a main PCB M assembled with the main body 210. Accordingly, the first antenna FPC 230 is electrically connected to the main PCB M. In the example shown in FIG. 27A, tape is used for attaching the first antenna FPC 230 to the inside surface 220a of the sliding housing 220.

The second antenna FPC 232 is linearly extendable and elastically bendable according to the sliding movement of the sliding housing 220 since the second antenna FPC 232 is made of a flexible member.

Figure 27A:
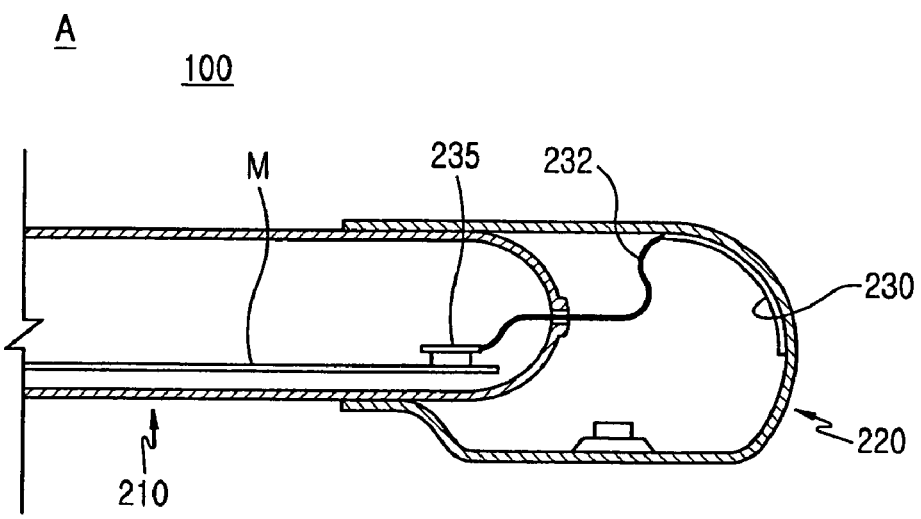
FIGS. 27A and 27B are side cross-sectional views of the antenna unit shown in FIG. 26 in states wherein the sliding housing is slid outward and inward, respectively.
Figure 27B:
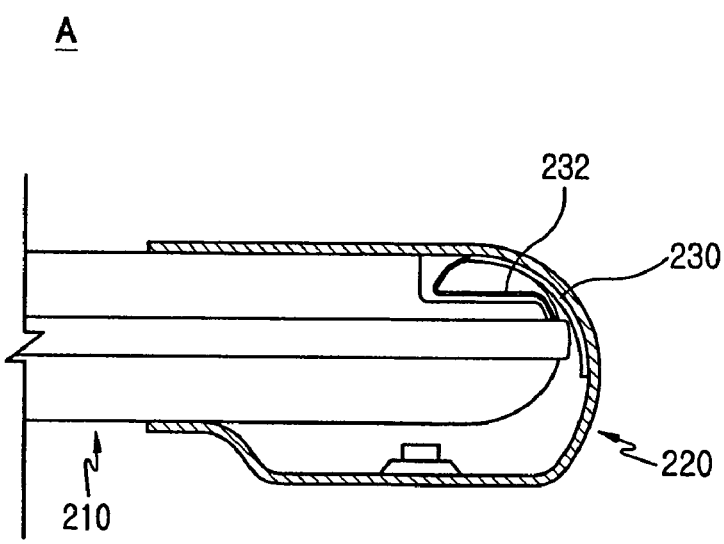

FIG. 27A shows a state wherein the sliding housing 220 is slid up along the main body 210, and FIG. 27B shows a state where the sliding housing 220 is slid down along the main body 210. Referring to FIGS. 27A and 27B, the second antenna FPC 232 is bent more than once and operates elastically. In this example, the second antenna FPC 232 also functions as an antenna.

Figure 28A:
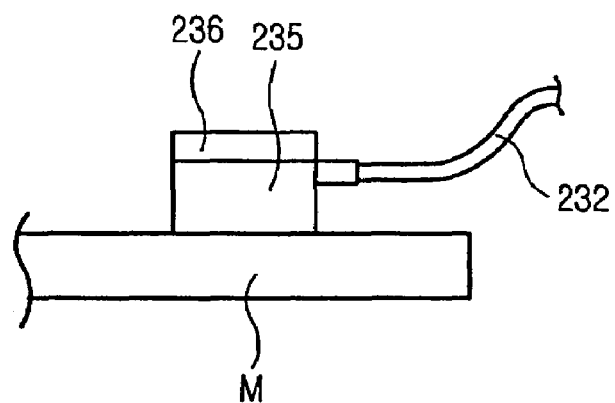
FIGS. 28A and 28B are side views of a second antenna flexible printed circuit (FPC) of the antenna unit shown in FIG. 26 in states wherein the second antenna FPC is shown connected and disconnected, respectively.
Figure 28B:
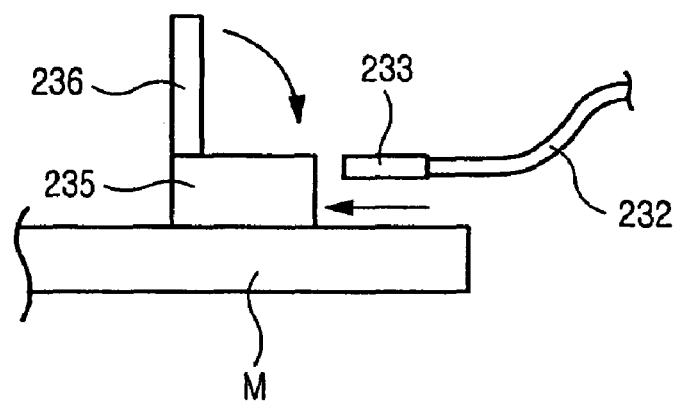

As shown in FIGS. 28A and 28B, the free end 233 (which can be made of a hard member in a pad shape) of the second antenna FPC 232 is shown plugged in and unplugged from, respectively, the plug connector 235 assembled with the main PCB M. The plug connector 235 provides a function of connecting the second antenna FPC 232 to the main PCB M, a function of securely fixing the second antenna FPC 232 to the main PCB M, and a function of simplifying the assembly of the second antenna FPC 232 with the main PCB M.

Referring to FIG. 28B, after a rotatable cover 236 of the plug connector 235 is fully opened, the free end 233 of the second antenna FPC 232 is plugged into the plug connector 235 and then the rotatable cover 236 is completely closed. Then, the second antenna FPC 232 is completely locked in the plug connector 235 as shown in FIG. 28A. The use of the plug connector 235 for the second antenna FPC 232 improves assembling efficiency in an assembling process. In order to unlock the locked second antenna FPC 232 from the plug connector 235, the rotatable cover 236 is fully opened again and the plugged free end 233 of the second antenna FPC 232 is unplugged from the plug connector 235. Then, the locking state of the second antenna FPC 232 is completely released.

The present invention provides sliding type antenna units and electrical connection devices for use therein, and portable devices using the same. Accordingly, an antenna housing of the variable built-in antenna is formed to easily slide along a main body, and in particular, a user can conveniently slide up/down a variable built-in antenna according to antenna reception sensitivity.

As described above, the present invention provides a variable built-in antenna that can be slid up/down according to its reception sensitivity in any one of an automatic, manual and semiautomatic mode, offering a greater degree of convenience to the user. Moreover, an antenna housing is formed to fully cover a top portion of a main body of a portable device, thereby preventing possible damage or cracks due to inadvertent dropping of the portable device. In addition, a sliding antenna unit in accordance with embodiments of the present invention uses a FPC, thereby improving its reliability, and in particular, the FPC undertakes an elastic function of the sliding antenna unit and a rotatable cover is further used to facilitate assembly of the antenna FPC.

While the invention has been shown and described with reference to a number of exemplary embodiments thereof, it will be understood by those skilled in the art that various changes in form and details may be made therein without departing from the spirit and scope of the invention as defined by the appended claims.

What is claimed is:

1. A portable device comprising:
   a main body;
   a variable built-in antenna which is assembled at a predetermined location of the main body and configured to slide up/down in a longitudinal direction of the main body according to antenna reception sensitivity, the variable built-in antenna comprising a slidable antenna housing to receive and cover at least four indented sides of an edge of the main body when retracted; and
   an electrical connection device for signal transmission between the main body and the variable built-in antenna.

2. The portable device of claim 1, wherein the antenna housing comprises:
   an edge portion, first and second side portions, and a rear portion to cover a predetermined portion of the main body, wherein
   the first and second side portions facilitate an opening/closing of the antenna housing, such that the antenna housing slides in a longitudinal direction of the main body while facing the main body, and wherein,
   the opening/closing of the antenna housing is based upon an antenna reception sensitivity.

3. The portable device of claim 1, wherein the variable built-in antenna is assembled with a top portion or a bottom portion of the main body.

4. The portable device of claim 1, wherein the main body comprises:
- a front surface;
- a sliding housing mounted on the front surface of the main body, wherein the sliding housing is configured to linearly slide in the longitudinal direction of the main body while facing the main body;
- at least one of a speaker unit, a display unit neighboring the speaker unit, and a first keypad which neighbors the display unit and which comprises a plurality of keys, mounted on a front surface of the sliding housing; and
- at least one of a second keypad which comprises a plurality of keys being exposed when the sliding housing is slid upward, and a microphone unit neighboring the second keypad, mounted on the front surface of the main body.

5. The portable device of claim 1, wherein the variable built-in antenna is configured to slide up/down in any one of an automatic, manual and semiautomatic operation modes.

6. A portable device comprising:
- a main body;
- a folder which is rotatably opened/closed with respect to the main body on a hinge axis;
- a variable built-in antenna which is assembled to face a bottom portion of the main body and configured to slide up/down in a longitudinal direction of the main body according to an antenna reception sensitivity, the variable built-in antenna comprising a slidable antenna housing to receive and cover at least four indented sides of an edge of the main body when retracted; and
- an electrical connection device for signal transmission between the main body and the variable built-in antenna.

7. A portable device comprising:
- a main body;
- a folder which is rotatably opened/closed with respect to the main body on a hinge axis;
- a variable built-in antenna which is assembled to face a top portion of the folder and configured to slide up/down in a longitudinal direction of the folder according to an antenna reception sensitivity, the variable built-in antenna comprising a slidable antenna housing to receive and cover at least four indented sides of an edge of the main body when retracted; and
- an electrical connection device for signal transmission between the folder and the variable built-in antenna.

8. A portable device comprising:
- a main body;
- a swing housing which is rotatably opened/closed on a hinge axis while facing a front surface of the main body;
- a variable built-in antenna which is assembled to face a bottom portion of the swing housing and configured to slide up/down in a longitudinal direction of the swing housing according to an antenna reception sensitivity, the variable built-in antenna comprising a slidable antenna housing to receive and cover at least four indented sides of an edge of the main body when retracted; and
- an electrical connection device for signal transmission between the swing housing and the variable built-in antenna.

9. A portable device comprising:
- a main body;
- a swing housing which is rotatably opened/closed on a hinge axis while facing a front surface of the main body;
- a variable built-in antenna which is assembled to face a top portion of the swing housing and configured to slide up/down in a longitudinal direction of the swing housing according to an antenna reception sensitivity, the variable built-in antenna comprising a slidable antenna housing to receive and cover at least four indented sides of an edge of the main body when retracted; and
- an electrical connection device for signal transmission between the swing housing and the variable built-in antenna.

10. A portable device comprising:
- a main body;
- a sliding housing which is assembled around a predetermined portion of the main body and configured to slide up/down in a longitudinal direction of the main body and receive and cover at least four indented sides of an edge of the main body when retracted;
- a variable built-in antenna which is assembled to face a top portion of the sliding housing and configured to slide up/down in a longitudinal direction of the sliding housing according to an antenna reception sensitivity; and
- an electrical connection device for signal transmission between the sliding housing and the variable built-in antenna.

11. A portable device comprising:
- a main body;
- a sliding housing which is assembled around a predetermined portion of the main body and configured to slide up/down in a longitudinal direction of the main body and receive and cover at least four indented sides of an edge of the main body when retracted;
- a variable built-in antenna which is assembled to face a bottom portion of the sliding housing and configured to slide up/down in a longitudinal direction of the sliding housing according to an antenna reception sensitivity; and
- an electrical connection device for signal transmission between the sliding housing and the variable built-in antenna.

* * * * *